Oct. 31, 1961  F. L. WENHAM ET AL  3,006,658

VEHICLE SPLASH GUARD AND BRACKET

Filed Aug. 29, 1957

INVENTORS
F. L. WENHAM
AND
S. J. KOSIK JR.

BY Robb & Robb
Attorneys

United States Patent Office 3,006,658
Patented Oct. 31, 1961

3,006,658
VEHICLE SPLASH GUARD AND BRACKET
Fred L. Wenham, 20050 Shaker Blvd., Shaker Heights, Ohio, and Samuel J. Kosik, Jr., 16616 Glendale, Cleveland, Ohio
Filed Aug. 29, 1957, Ser. No. 680,970
5 Claims. (Cl. 280—154.5)

This invention relates to vehicle splash guards, and particularly to the construction and mounting thereof on heavy highway vehicles.

While the provision of splash guards generally has been compelled by reason of the laws of several States, it has been found that many different concepts are suitable and comply with such laws.

Inasmuch as the purpose of the guards is to reduce the quantity if not entirely eliminate the amount of material thrown toward the windshields of following vehicles, and certain types of guards are less effective than others, more stringent requirements have recently been incorporated in a new law in at least one state. Such requirements virtually compel the provision of guards in the form of fenders on semi-trailers and the like, with resulting high cost and installation difficulties, not to mention the fact that previous guard members are rendered useless and must be removed.

The instant invention obviates the objections suggested and described by the foregoing, in that the concept hereof enables the provision of splash guards which will effect the results sought, at minimum cost, without rendering prior guards useless, or requiring redesign of the vehicle or complicated installation techniques.

Broadly stated, this invention contemplates the provision of novel bracket members which may be easily installed on the truck or trailer body, adjacent the wheels thereof, and the connection thereto of the presently installed splash guard or guards, better known as mud flap or flaps, effective splash guards being thereby constructed which function equally as well as more expensive fenders. While this arrangement conforms to the law, at the same time it does not introduce new problems of maintenance which have been found to result where common fenders are availed of to comply with such law.

With the foregoing in mind, therefore, a principal object of this invention is to provide a splash guard construction, which will comply in every way with the law, be inexpensive to make, simple to install and generally more practical and effective than other arrangements heretofore known.

Another object of the invention is to provide bracket means which may be installed on vehicles and in conjunction with as well as connection with presently existing guard members, effectively prevent rear splash and side throw of material during movement of the vehicle.

Yet a further object of the invention is to arrange the bracket means so that they may be attached to a vehicle and the existing guards in turn connected therewith in such a manner as to cause such guards to generally follow the contour of the tire or tires whether to comply with the law or otherwise, and enhance the effectiveness of the construction thereby.

Still another object of the invention is to so construct bracket means and enable the installation thereof as to obviate maintenance problems caused by common fender or similar construction which problems are caused by the necessity of backing the vehicle to which such fenders are attached, against loading docks or other equivalent places, which may cause damage to the fenders and in turn the tires adjacent thereto.

Other and further objects of the invention will be understood from a consideration of the specification appended hereto and shown in the drawing wherein.

Figure 1:
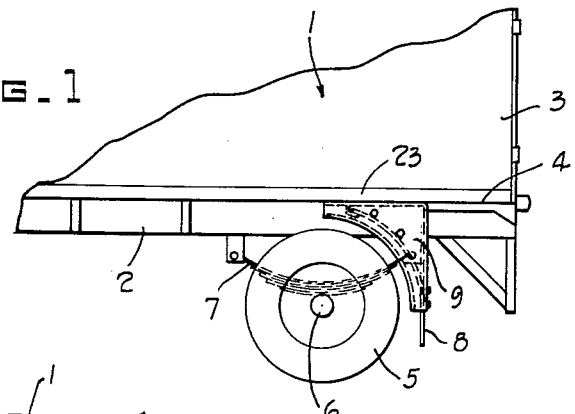
FIGURE 1 is a view in side elevation, somewhat fragmentary showing the general manner of installation and construction of the splash guard hereof.

Referring now to the drawing, there is shown in FIGURE 1 a rear portion of a highway vehicle known as a semi-trailer, designated 1, including frame 2 thereof and the body 3 mounted thereon the bottom of the body or bed being designated at 4.

Such a trailer is commonly known and will usually be provided with a van type body or other type body as the case may be which has been here illustrated, and supported on dual rear wheels generally denoted 5, the wheels, of course, being mounted on a transverse axle 6 connected by means of the usual springs 7 to the frame 2 of the vehicle.

The wheels 5 may be located in several different positions in connection with the frame and thus the position shown here is primarily illustrative, it being desirable however to control if not prevent absolutely the rear splash and side throw of material picked up by the tires during movement of the vehicle in forward direction, this being obviously desirable to prevent splashing on the windshield of cars or other vehicles following and obscuring the vision of the drivers or operators thereof.

Figure 2:
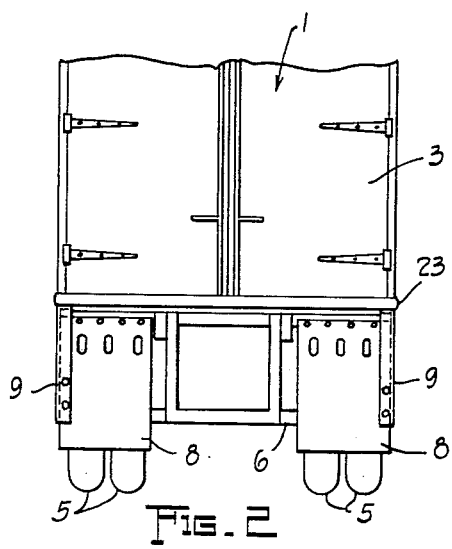
FIGURE 2 is a rear view of a truck trailer showing the splash guards installed in accordance with this invention, the disclosure being somewhat fragmentary.

Heretofore what are termed mud flaps, such as are illustrated at 8 in FIGURE 2 have been provided, the same being suspended in any preferred manner beneath the bed 4 of the vehicle so as to largely reduce the amount of rear splash caused by the vehicle tires. However, of course, such flaps are only partially effective, due to the fact that they are usually flexible in order to prevent damage when the vehicle is backed to a loading dock or the like and thus have a tendency to be affected substantially by moving air as the vehicle moves forward.

In view of this situation, certain new requirements of at least one state have been incorporated into law to prevent side throw of material, in large measure which likewise has heretofore caused the obscuring of windshields of following vehicles.

Figure 5:
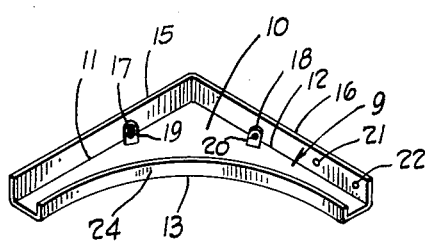
FIGURE 5 is a perspective view showing the brackets used in the splash guard construction hereof.

This invention accomplishes this purpose and likewise serves to reduce the amount of rear splash by the provision of the bracket shown in FIGURE 5 and generally designated 9, which bracket is of course provided in pairs at least as shown as being mounted in FIGURE 2 at opposite sides of the vehicle body, the bracket to be described now in more detail as to its function with respect to such body and the previously existing mud flaps 8 provided.

Describing the bracket 9 more in detail, it will be noted that it is provided with a generally triangular body, having the side 11 and a further side 12 at substantially right angles thereto, the third side of the body being comprised of an arcuate section 13.

The sides 11 and 12 may be in turn equipped with lips such as 15 and 16 respectively which lips in respect to lip 15 for example will facilitate the mounting of the bracket as a whole beneath the bed and along the lower portion of the body 4, as well as stiffening the body 10 of the bracket 9, the lip 16 at the side 12 being similarly provided but in addition serving a further function of acting as a means for connecting the flap member such as 8 thereto and to the bracket 9 as a whole in a manner to be explained as this description proceeds.

The bracket body 10 may be equipped with suitable ears such as 17 and 18, which are either pressed out of the material of which the bracket as a whole is formed, or otherwise attached thereto in any preferred manner, such ears 17 and 18 being in turn equipped with suitable openings 19 and 20 to receive bolts therein, similar openings 21 and 22 being formed in the lip 16 previously mentioned.

Figures 3, 4:
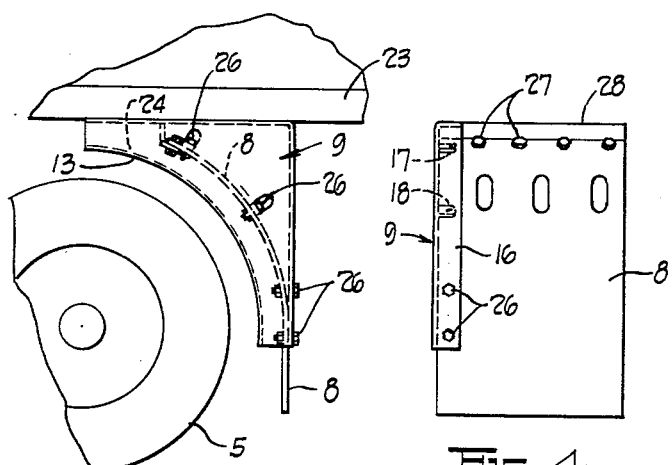
FIGURE 3 is somewhat enlarged view, likewise fragmentary, illustrating more in detail the construction and connection of the various parts of the splash guard and relationship to the wheel or wheels.
FIGURE 4 is a rear view in enlarged condition of the view in FIGURE 3.

Referring now to FIGURE 3, it will be seen that the bracket 9 as a whole is mounted just beneath or attached to the rub rail 23, such attachment being effected as by means of welding or other similar fastening arrangement, the bracket being positioned with respect to the wheels 5 and the tires thereon so as to be adjacent the periphery and spaced slightly therefrom. The lip 24 is furnished at the arcuate section 13 of the body 10, which lip 24 is primarily availed of for stiffening purposes and likewise to prevent cutting the tire during motion of the vehicle as a whole.

As viewed in FIGURE 3, the flap member 8 which is one which has heretofore been used and suspended vertically behind the wheel for example is connected at one edge as by means of bolts positioned in the openings 17, 18, 21 and 22 previously mentioned, corresponding openings being formed in the flap member likewise so as to lie in the position illustrated in dotted lines in FIGURE 3 and thus largely following the contour of the periphery of the wheels 5, suitable bolts such as 26 being furnished to fasten the flap in the position shown.

In addition, the flap will be provided at its upper edge with a series of openings such as will receive bolts illustrated in FIGURE 4 and denoted at 27, which in turn are connected to a transversely extending part of metal denoted 28, which part 28 may be in turn fastened beneath the body of the vehicle and thus support the flap 8 throughout its lateral extent.

It will be apparent of course that the flap at the opposite side of the vehicle will be similarly mounted, the bracket 9 being of the opposite hand. The flap member 8 will of course extend below the bracket itself and within a short distance of the ground on which the vehicle is traveling so as to minimize the rear throw of the material picked up by the tire during its motion. Of course the extent to which the body 10 of the bracket is arranged so as to lie beyond the flap 8, will act as a lip or side throw reducing section of the bracket for material picked up by the tire or tires during their rotation.

Figure 6:
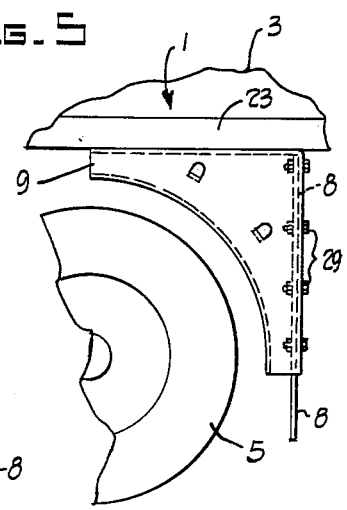
FIGURE 6 is a fragmentary view in side elevation, showing a modification of the installation and construction of this invention.

Since one of the main purposes is largely to prevent this side throw and likewise to assist in restraining the rearward motion of the flap 8, modification of this construction will likewise be effective and is illustrated in FIGURE 6 wherein the bracket 9 is mounted as is true in FIGURE 3, the only difference in this case being that the flap 8 is mounted so as to extend vertically along the lip or flange 16 as illustrated in dotted lines in the said FIGURE 6 and secured thereto. The bolts 29 in this instance will be provided to secure the flap body or member 8 thereto and it will not be necessary to avail of the ears 17 and 18 formed in the body unless it is desirable to cause the flap member to follow the contour of the wheel. It may be desirable to drill additional holes in flange 16 to provide for additional bolts 29, as shown in FIGURE 6, but this is not absolutely necessary. It will be understood that this will simplify to some extent the installation yet render the effectiveness of the arrangement equally as great since side throw will be minimized as well as the rear splash and movement of the flap 8 usually provided.

This latter construction will also simplify to a large extent the installation problems connected with changes of this kind, since usually the bracket 9 will be able to be positioned in connection with the flap 8 and thereafter welded or otherwise secured along the rub rail 23 in a very simple manner without necessitating the removable of the flap 8 from its position.

We claim:

1. In a conversion unit of the class described, in combination, a flexible flap member adapted to be connected at its upper edge to a vehicle body, and a bracket adapted to be connected to such body and the flap for rigidifying the flap, to minimize swinging movement of said flap member, said bracket comprising a first generally horizontal edge portion for connection to such vehicle body, a second edge portion extending downwardly from the first, a third edge portion extending from the first to the second and contoured to correspond generally to the periphery of a tire, and said bracket further including means to attach an edge of the flap member thereto.

2. In a conversion unit of the class described, in combination, a bracket, a first edge portion of the bracket being arranged to attach the same to a vehicle, a second edge portion extending at substantially right angles to the first, a flap member of flexible material connected by an edge to such vehicle so as to depend vertically therefrom, means for attachment of the flap member adjacent said second edge portion of the bracket aforesaid, in a manner to rigidify the connection of the bracket and vehicle, and a third edge portion of the bracket extending about from the first to the second portions and contoured to correspond to the periphery of a tire.

3. A conversion unit for vehicle splash guards comprising a generally triangular shaped part having a flange portion for attachment to a vehicle body or the like, a further flange portion extending downwardly therefrom, and an arcuately shaped section arranged to generally conform to and be spaced from the periphery of a tire or the like, and means on the part for attachment of a splash guard member, such splash guard member being adapted to be connected by an edge thereof to such vehicle body and to the part along an adjacent edge of such member, thus positioning such member and thereby reducing rearward splash, the arcuately shaped section of the part reducing side throw caused by the wheels adjacent which such member and part are arranged, the means on the part adapted for attachment of a splash guard member comprise spaced ears arranged in arcuately aligned position generally conforming to the section described, said ears facilitating attachment of an edge of a splash guard member to the part to thereby position such member in arcuate condition.

4. In a vehicle splash guard of the class described, in combination, a generally triangular bracket body having two side edge portions at substantially right angles, and an arcuate portion constituting generally the third side edge, said body having means for mounting the same on a vehicle body, and a flexible rubber-like flap member being connected by an edge thereof to such vehicle body and to the bracket body along an adjacent edge of such flap member by connecting elements, at least one side edge portion of the bracket body comprising a flange having an opening therein constituting a connecting element, ear members arranged on the body spaced from and substantially parallel with the arcuate portion mentioned and comprising other connecting elements, said flap member being secured to said flange and ear members.

5. A conversion unit for vehicle splash guards comprising a generally triangular shaped part having a flange portion for attachment to a vehicle body or the like, a further flange portion extending downwardly therefrom, and an arcuately shaped section arranged to generally conform to and be spaced from the periphery of a tire or the like, and means on the part for attachment of a splash guard member, such splash guard member being adapted to be connected by an edge thereof to such vehicle body and to the part along an adjacent edge of such member, thus providing for positioning such member and thereby reducing rearward splash, the arcuately shaped section of the part reducing side throw caused by the wheels adjacent which such member and part are arranged, the means on the part adapted for attachment of a splash guard member comprising spaced ears arranged in arcuately aligned position generally conforming to the section described, said ears facilitating attachment of an edge of such splash guard member to the part to thereby position such member in arcuate condition, and other means on the part along the said further flange portion for attachment of an edge of such splash guard member to the part, to thereby position such member in generally vertical condition.

References Cited in the file of this patent

UNITED STATES PATENTS

| | | |
|---|---|---|
| 2,605,119 | Earnest | July 29, 1952 |
| 2,679,403 | Howard et al. | May 25, 1954 |
| 2,843,954 | Rheeling | July 22, 1958 |
| 2,844,388 | Rheeling | July 22, 1958 |